July 11, 1950 M. R. MISKIN 2,514,782
WHEELED EARTH SCRAPER
Filed June 25, 1947 2 Sheets-Sheet 1

Inventor
Merlin R. Miskin,
Attorney

July 11, 1950  M. R. MISKIN  2,514,782
WHEELED EARTH SCRAPER
Filed June 25, 1947  2 Sheets-Sheet 2

Inventor
Merlin R. Miskin,
B. B. Collings
Attorney

Patented July 11, 1950

2,514,782

UNITED STATES PATENT OFFICE 2,514,782

WHEELED EARTH SCRAPER

Merlin R. Miskin, Ucon, Idaho, assignor to Arthur R. Miskin, Ucon, Idaho

Application June 25, 1947, Serial No. 756,828

6 Claims. (Cl. 37—129)

The invention relates to wheeled earth scrapers of the type wherein an earth-receiving and transporting pan or scoop is mounted for movement over the ground behind a tractor or like towing vehicle, and is arranged to be moved at will between a ground-scraping or filling position, a somewhat elevated carrying position, and a dumping or discharging position. The present machine also includes a gate or apron for closing the open side of the scoop when in said carrying position, whereby to prevent escape of the earth during transport, which gate is automatically moved, in co-ordination with movements of the scoop, between its carrying and filling positions, to and from a position permitting substantially unrestricted access of the earth to the scoop when the latter is in said filling position. Fluid actuated means, such for example as hydraulic rams or motors, are provided on the machine for effecting the several movements of the scoop and gate, the motive fluid for such power means being supplied through appropriate conduits extending to a fluid pump on the tractor. Suitable controls for governing the supply of fluid to the motors, and exhaust therefrom, are preferably located on the tractor adjacent the operator's seat, whereby from such station one man may control all operations of both tractor and scraper.

The invention has, for one of its more important objects, the provision of improved mechanism for effecting and co-ordinating the various movements of the scraper pan and gate.

A practical embodiment of the invention is illustrated in the accompanying drawings forming a part of this specification, in which.

Figure 1:
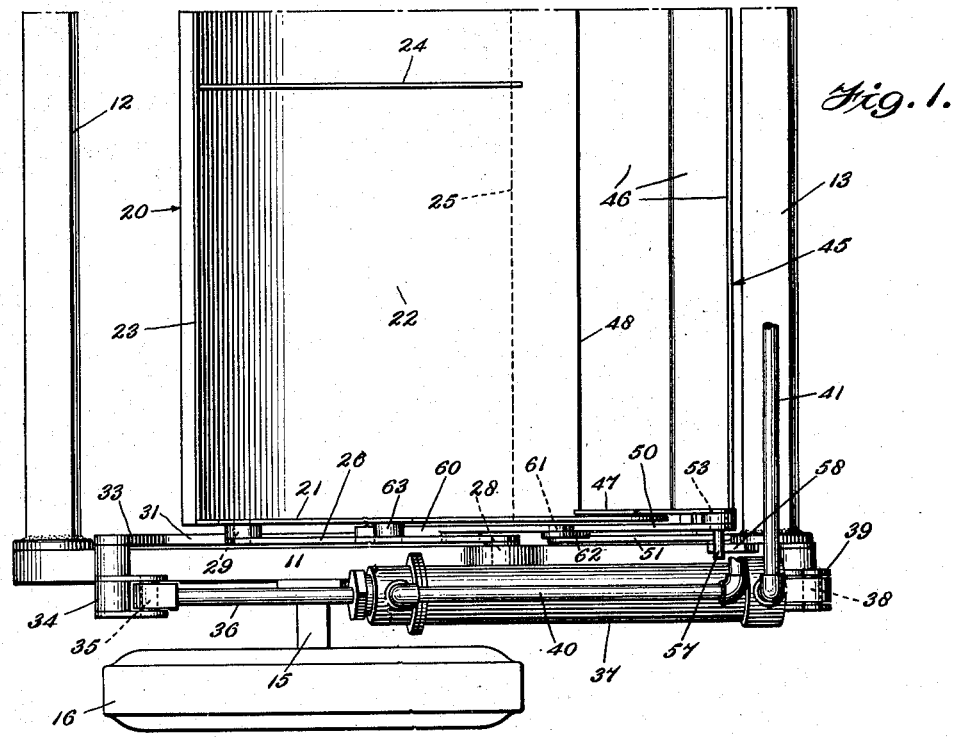
Figure 1 is a plan view of one side portion of an earth scraper constructed and arranged in accordance with the invention.

Referring to the said drawings more in detail, while but one side of the scraper has been illustrated, it will be understood that all of the parts shown are duplicated at the other side, in like relationships.

The machine comprises a rigid rectangular frame composed of side members 11 and transverse members 12 and 13, from the mid portion of the latter of which there extends a tongue 14 by means of which the machine may be connected to and drawn by a tractor or similar vehicle. Each side member 11 rigidly carries a stub axle 15 upon which is mounted a supporting wheel 16. Positioned within the frame members 11, 12 and 13 is a rectangular pan or scoop 20, comprising end walls 21, a bottom wall 22 and a rear wall 23. The top and front of the scoop are open, and suitable transversely spaced vertically disposed bracing plates 24 may be provided within the scoop to reinforce the bottom and rear walls thereof against undue deformation. The forward edge of the bottom wall 22 may also be reinforced by a hardened and sharpened cutter plate 25.

The scoop is movably mounted in the frame by means of guide links 26, and supporting and actuating bell-crank levers 27. One end of each link 26 is pivotally connected to the adjacent frame side member 11, as at 28, while the other ends of such links are pivotally connected to rearward portions of the respective end walls 21 of the scoop, as at 29. The bell-crank levers 27 are pivotally mounted on the respective frame members 11 at 30, with one of their arms 31 being pivotally connected at 32 to the medial portion of the adjacent end wall 21 of the scoop, while their other arms 33 extend upwardly and terminate in shackles 34 to which are pivotally connected, as at 35, the piston rods 36 of hydraulic rams or like fluid or fluid pressure motors 37. These rams parallel the frame members 11 and their front ends are pivotally supported as at 38 in shackles 39 rigidly carried by the forward ends of the said frame members. Motive fluid is supplied to and exhausted from the respective ends of the ram cylinders by means of pipes 40 and 41, to which are connected the rubber hosings or like flexible conduits 42 and 43 (Fig. 2) which extend forwardly to the tractor. As above indicated, this vehicle is equipped with any suitable fluid pump for supplying fluid under pressure to the said conduits, and also with appropriate conventional control valves whereby the fluid may be fed to and exhausted from the respective ends of the ram cylinders as required.

Figure 2:
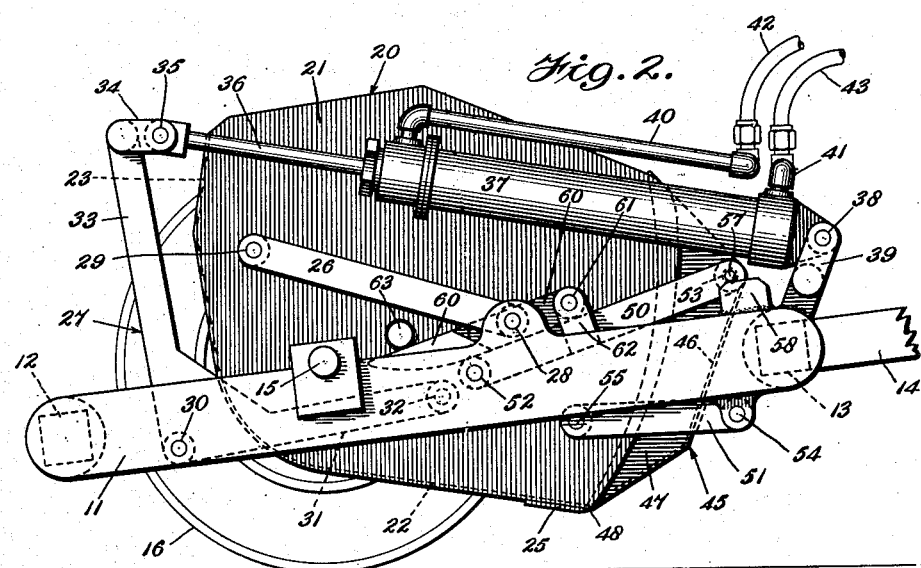
Fig. 2 is a side elevational view of the parts shown in Fig. 1, the near wheel being omitted for the sake of clearness, and the parts being shown in the carrying position.

Also mounted within the frame is a movable apron or gate 45, arranged to close the open front of the scoop 20 when the latter is in its carrying or transport position, shown in Fig. 2. This gate comprises a front wall 46 extending the full width of the scoop and provided at each of its ends with a right-angular wing 47, which wings fit within and slightly overlap the forward edge of the respective end walls 21 of the scoop. In the carrying position of the scoop, the lower edge of the gate wall 46 substantially meets or abuts the forward edge 48 of the bottom wall 22 of the scoop, the said gate wall thus in effect constituting a front wall for the scoop which retains the load of material in the latter during transport.

Figure 3:
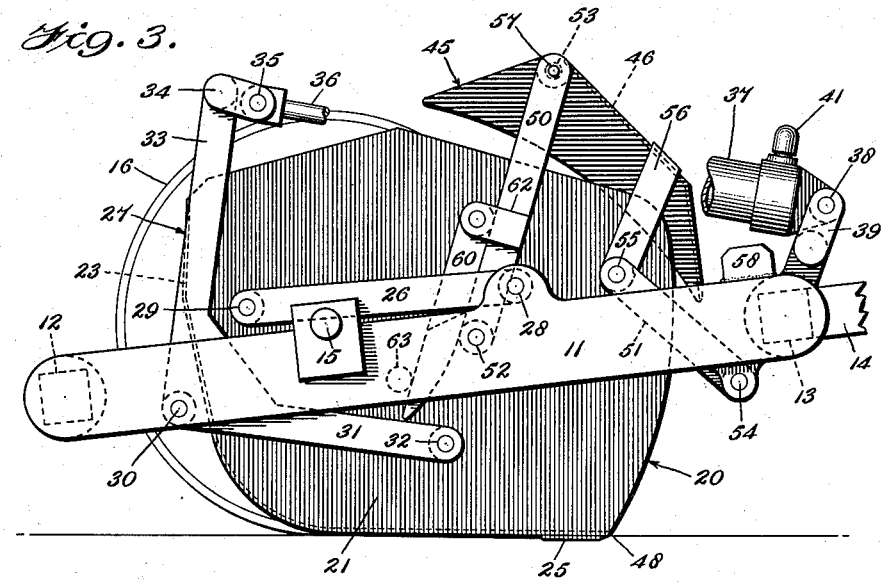
Fig. 3 is a view similar to Fig. 2 (a portion of the parts being broken away), illustrating the positions assumed by the various parts when the scoop is in its filling position.

The gate 45 is swingably mounted on the frame by supporting and actuating links 50, and supporting and guiding links 51. One end of each link 50 is pivotally connected as at 52 to the adjacent frame member 11, while the other ends of such links are pivotally connected at 53 to the respective gate wings 47. One end of each link 51 is pivotally connected at 54 to the adjacent frame member 11, and the other ends of the said links are pivotally connected at 55 to arms 56 rigidly carried by the gate 45. These arms are best shown in Fig. 3, since in the Fig. 2 and Fig. 4 positions the arms lie directly behind the links 51.

Figure 4:
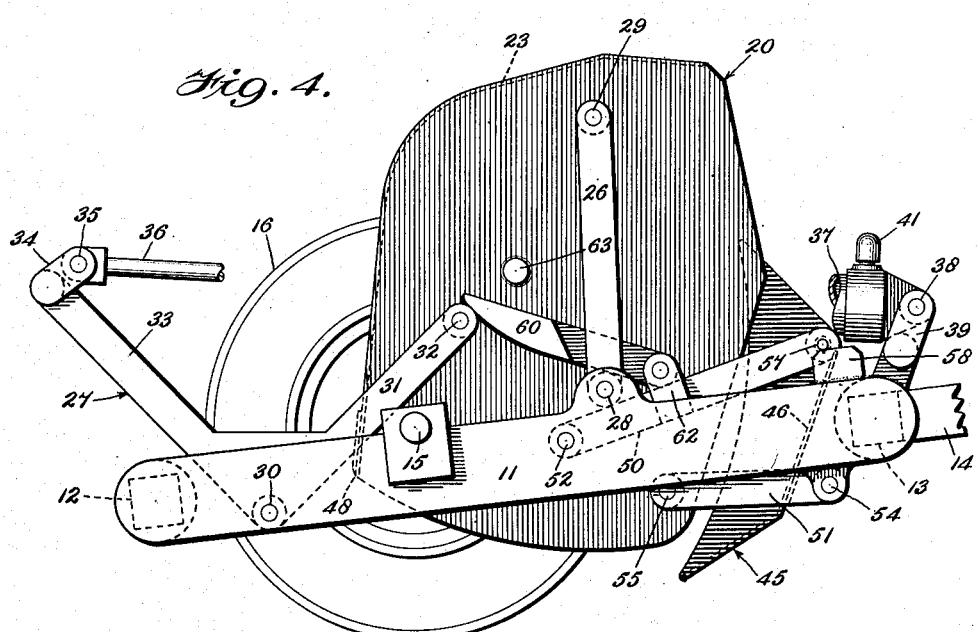
Fig. 4 is a like view, showing the parts in the positions they occupy when the scoop is being discharged.

The pivots 53 which connect the links 50 to the gate wings 47 are provided with extensions 57 positioned to engage stop members 58 carried by the frame members 11, whereby to limit downward movement of the said links and gate to the positions shown in Figs. 2 and 4.

Each link 50 carries a dog 60 overlying the rearward end portion of such link and pivotally connected at 61 to straps 62 rigidly carried by the link. The dogs project somewhat beyond the rear ends of their links, and their upper surfaces are engageable by pins or lugs 63 rigidly carried by and projecting from the end walls 21 of the scoop. These dogs and lugs provide means for transmitting motion from the scoop, through links 50, to the gate 45, whereby the latter may be elevated to the inoperative position shown in Fig. 3 as the scoop is moved to its ground-scraping or filling position, as will appear more fully below.

The operation of the above described mechanism is as follows:

Assuming the parts to be in the positions shown in Fig. 2, if it be desired to fill the scoop, the control valve at the operator's station on the tractor is manipulated to supply fluid under pressure to the left hand ends of the rams 37, resulting in movement of the piston rods 36 toward the right. This swings the bell-crank levers 27 in a clockwise direction and through the pivotal connections 32 of their arms 31, lowers the scoop 20 to bring the leading edge 48 of its bottom wall 22 into scraping engagement with the ground. In this lowering of the scoop it is guided by the links 26, which cause it to assume the position shown in Fig. 3, with its bottom wall 22 more or less parallel to the ground surface.

As the scoop is thus lowered, the pins or lugs 63 carried by its end walls 21 press downwardly on the dogs 60 which, through their connections 61 and the straps 62, swing the links 50 in a counterclockwise direction about their pivots 52, thereby raising the gate 45 to the Fig. 3 position. The front of the scoop is thus opened for the admission of earth as the scoop is drawn over the ground by the tractor. The lower portion of the gate 45 is guided during the gate movements to and from the Fig. 3 position by the links 51 and arms 56, as will be readily understood.

When the desired quantity of earth has entered the scoop, the control valve on the tractor is manipulated to shift the fluid supply to the right hand end of the rams 37, thus reversing the above described motions of the various parts and restoring them to the Fig. 2 position, which they retain during transport of the earth contained in the scoop to the point at which it is to be discharged. During the restoration of the parts to the carrying position, the gate 45 is not positively actuated but rather drops by gravity action, since at its highest point (shown in Fig. 3) the pivotal connections 53 between the links 50 and gate 45 have not passed beyond the vertical plane of the link pivots 52, and therefore as the lugs 63 relieve their pressure on the dogs 60, the gate will drop back to the Fig. 2 position, where it will prevent the contents of the scoop from spilling out through the open front thereof.

When the point of discharge is reached, the operator manipulates the control valve to supply additional fluid to the right hand ends of the rams 37, thereby effecting swinging of the bell-cranks 27 in a counterclockwise direction from the Fig. 2 to the Fig. 4 position. By reason of the linkage 26 this motion of the bell-cranks produces a bodily tilting of the scoop through an angle of approximately 90° and brings its open forward side to the bottom, and its bottom wall 22 to a substantially vertical position, as will be clear from Fig. 4. During this action the gate 45 is retained in its Fig. 2 position by reason of the engagement of the pivot extensions 57 with the frame carried stops 58, and the gate thus does not interfere with the discharge of the earth from the now downwardly facing open side of the scoop.

During the swinging of the scoop to the Fig. 4 position, the pivoted ends 32 of the bell-crank arms 31 engage the under surfaces of the dogs 60, but since these are pivoted on their links 50 and since the swinging of the scoop moves the lugs 63 upwardly out of their way, the dogs are merely swung upwardly on their pivots 61 without transmitting any motion to the links 50 and gate 45.

The parts may be left in the Fig. 4 position during return of the machine to the loading point, or if desired the rams may be actuated to restore the scoop to the Fig. 2 position for such return trip.

What is claimed is:

1. In a wheeled earth scraper, the combination of a frame mounted for ground traverse; a scoop having end walls and an open side, mounted on the frame for movements between a ground-scraping and filling position and an elevated carrying position; means for positively moving the scoop between said positions at will; a gate disposed adjacent the scoop and normally positioned to substantially close the open side of the latter when it is in its said carrying position; means mounting said gate on the frame for vertical swinging movements relative to the scoop, comprising a pair of supporting and actuating links and a pair of supporting and guiding links, each pivotally connected to the gate and to the frame; and projections on the end walls of said scoop engageable with portions of said actuating links as the scoop is moved from its carrying to its filling position, whereby to exert force on such links and thereby swing the gate to an elevated position substantially clearing the open side of the scoop, said projections relieving their pressure on the gate actuating links as the scoop is returned to its carrying position, whereby the gate may be restored to its normal position by gravitational action.

2. In a wheeled earth scraper, the combination of a frame mounted for ground traverse; a scoop having end walls and an open forward side, mounted on the frame for movements between a ground-scraping and filling position and an elevated carrying position; means for positively moving the scoop between said positions at will; a gate disposed adjacent the scoop and normally positioned to close the open forward side of the latter when it is in its said carrying position; means mounting said gate on the frame for vertical swinging movements relative to the scoop, comprising a pair of supporting and actuating links and a pair of supporting and guiding links, said actuating links being pivotally connected at one end to the frame and at their other end to the upper portion of the gate, and said guiding links being pivotally connected at one end to the frame and at their other end to the lower portion of the gate, whereby the sets of links may impart a compound movement to the gate; and pins projecting from the end walls of the scoop, positioned to engage portions of said actuating links as the scoop is moved between its said carrying and filling positions, whereby to swing the links and raise the gate substantially clear of the open side of the scoop in the filling position of the latter.

3. In a wheeled earth scraper and carrier, the combination of a wheel-mounted frame; a scoop having an open forward side for the admission and discharge of earth; scoop-supporting arms vertically swingably mounted on said frame and having pivotal connections with the scoop medially between its forward and rearward sides; controllable power means connected to said arms for swinging them to raise and lower the scoop at will between a lowered ground-scraping and filling position, an elevated discharging position, and an intermediate carrying position; and a simple inextensible link disposed longitudinally of the frame and having one of its ends pivotally connected thereto and its other end pivotally connected to the scoop independently of the arm pivots thereof, said link translating the motion of the scoop-supporting arms throughout their movement of the scoop from its scraping position to its carrying and discharging positions into unidirectional tilting movement of the scoop about its arm pivots whereby to materially elevate the rearward portion of the scoop above its open forward side in said discharging position, the link reversing said tilting movement throughout lowering of the scoop from said discharging position to its carrying and scraping positions.

4. In a wheeled earth scraper and carrier, the combination of a wheel-mounted frame; a scoop having an open forward side for the admission and discharge of earth; vertically swingable scoop-supporting arms pivotally connected to the scoop medially between its forward and rearward sides, said arms being swingably mounted on the frame at a point longitudinally displaced from the scoop pivots; controllable power means connected to said arms for swinging them to raise and lower the scoop at will between a lowered ground-scraping and filling position, an elevated discharging position, and an intermediate carrying position; and a simple inextensible link disposed longitudinally of the frame and having one of its ends pivotally connected to the scoop independently of the arm connections therewith and its other end pivotally connected to the frame at a point longitudinally displaced from such arm connections in a direction opposite to the displacement of the arm mounting on the frame, said link translating the motion of the scoop-supporting arms throughout their movement of the scoop from its scraping position to its carrying and discharging positions into unidirectional tilting movement of the scoop about its arm pivots whereby to materially elevate the rearward portion of the scoop above its open forward side in said discharging position, the link reversing said tilting movement throughout the lowering of the scoop from said discharging position to its carrying and scraping positions.

5. In a wheeled earth scraper and carrier, the combination of a wheel-mounted frame; a scoop having an open forward side for the admission and discharge of earth; vertically swingable scoop-supporting arms pivotally connected to the scoop medially between its forward and rearward sides, said arms being swingably mounted on the frame at a point adjacent one of said scoop sides; controllable power means connected to the arms for swinging them to raise and lower the scoop at will between a lowered ground-scraping and filling position, an elevated discharging position, and an intermediate carrying position; and a simple inextensible link disposed longitudinally of the frame and having one of its ends pivotally connected to the scoop at a point longitudinally displaced from the medial portion of the latter in the same direction as the displacement of the arm mounting on the frame, the other end of said link being pivotally connected to the frame at a point longitudinally displaced in the opposite direction from the medial portion of the scoop, said link translating the motion of the scoop-supporting arms throughout their movement of the scoop from its scraping position to its carrying and discharging positions into unidirectional tilting movement of the scoop about its arm pivots whereby to materially elevate the rearward portion of the scoop above its open forward side in said discharging position, the link reversing said tilting movement throughout lowering of the scoop from said discharging position to its carrying and scraping positions.

6. In a wheeled earth scraper and carrier, the combination of a wheel-mounted frame; a scoop having an open forward side for the admission and discharge of earth; vertically swingable scoop-supporting arms pivotally connected to the lower portion of the scoop medially between its forward and rearward sides, said arms being swingably mounted on the frame at a point adjacent the rearward side of the scoop; controllable power means connected to said arms for swinging them to raise and lower the scoop at will between a lowered ground-scraping and filling position, an elevated discharging position, and an intermediate carrying position; and a simple inextensible link disposed longitudinally of the frame and having one of its ends pivotally connected thereto adjacent the medial portion of the scoop, the other end of said link being pivotally connected to the rearward portion of the scoop, said link translating the motion of the scoop-supporting arms throughout their movement of the scoop from its scraping position to its carrying and discharging positions into unidirectional tilting movement of the scoop about its arm pivots whereby to materially elevate the rearward portion of the scoop above its open forward side in said discharging position, the link reversing said tilting movement throughout lowering of the scoop from said discharging position to its carrying and scraping positions.

MERLIN R. MISKIN.

REFERENCES CITED

The following references are of record in the file of this patent:

UNITED STATES PATENTS

| Number | Name | Date |
| --- | --- | --- |
| 2,159,045 | Paulsen et al. | May 23, 1939 |
| 2,227,433 | Berner | Jan. 7, 1941 |
| 2,445,260 | Brimhall | July 13, 1948 |